(12) United States Patent
Skogo (10) Patent No.: US 10,705,600 B2
(45) Date of Patent: Jul. 7, 2020

(54) METHOD AND APPARATUS FOR DETECTING AND FOLLOWING AN EYE AND/OR THE GAZE DIRECTION THEREOF

(71) Applicant: TOBII AB, Danderyd/SE (SE)

(72) Inventor: Marten Skogo, Danderyd (SE)

(73) Assignee: Tobii AB, Danderyd (SE)

( * ) Notice: Subject to any disclaimer, the term of this patent is extended or adjusted under 35 U.S.C. 154(b) by 116 days.

(21) Appl. No.: 14/804,524

(22) Filed: Jul. 21, 2015

(65) Prior Publication Data

US 2016/0018889 A1 Jan. 21, 2016

(30) Foreign Application Priority Data

Jul. 21, 2014 (GB) ...................................... 1412905

(51) Int. Cl.
| | | |
|---|---|---|
| H04N 5/00 | (2011.01) | |
| G06F 3/01 | (2006.01) | |
| G06K 9/00 | (2006.01) | |
| G06T 7/80 | (2017.01) | |
| H04N 5/232 | (2006.01) | |

(52) U.S. Cl.
CPC .......... *G06F 3/013* (2013.01); *G06K 9/00604* (2013.01); *G06T 7/80* (2017.01); *H04N 5/23219* (2013.01)

(58) Field of Classification Search
CPC ........ G06F 3/01; G06F 3/013; G06F 3/04842; G02B 27/01; G02B 27/017; G02B 2027/014; G02B 2027/0187; G02B 2027/0138; G02B 2027/0178
See application file for complete search history.

(56) References Cited

U.S. PATENT DOCUMENTS

| | | | |
|---|---|---|---|
| 6,152,563 A | 11/2000 | Hutchinson et al. | |
| 7,742,623 B1 | 6/2010 | Moon et al. | |
| 7,884,977 B2 * | 2/2011 | Mori ....................... | H03M 7/30 358/505 |
| 8,086,044 B2 * | 12/2011 | Feng ........................ | H04N 1/41 382/220 |
| 8,314,707 B2 | 11/2012 | Kobetski et al. | |
| 2006/0238707 A1 | 10/2006 | Elvesjo et al. | |

(Continued)

FOREIGN PATENT DOCUMENTS

| | | |
|---|---|---|
| DE | 102007030378 A1 | 1/2009 |
| EP | 2042079 A1 | 4/2009 |
| EP | 2733006 A2 | 5/2014 |

OTHER PUBLICATIONS

Kanbara et al. "A Stereoscopic Video See-through Augmented Reality System Based on Real-time Vision-based Registration," Proc. IEEE Virtual Reality 2000, pp. 255-262, 2000.*

(Continued)

*Primary Examiner* — Frank F Huang
(74) *Attorney, Agent, or Firm* — Samuel Yamron (57) ABSTRACT

An eye-tracking system comprises an illuminator that directs infrared light towards a detection region, a camera configured to generate an image of the detection region and a controller configured to detect a calibration target in the image and to detect or determine changes in the position and/or orientation of the camera relative to the calibration target. The eye-tracking system can be installed in a vehicle.

20 Claims, 3 Drawing Sheets

(56) References Cited

U.S. PATENT DOCUMENTS

| | | | |
|---|---|---|---|
| 2008/0143820 A1* | 6/2008 | Peterson | G06T 3/4038 348/36 |
| 2008/0212942 A1* | 9/2008 | Gordon | H04N 21/8545 386/282 |
| 2009/0196460 A1 | 8/2009 | Jakobs et al. | |
| 2011/0234750 A1* | 9/2011 | Lai | G03B 37/04 348/37 |
| 2012/0154441 A1 | 6/2012 | Kim | |
| 2012/0249957 A1* | 10/2012 | Shibata | A61B 3/0025 351/206 |
| 2012/0250980 A1* | 10/2012 | Gillard | H04N 5/2226 382/154 |
| 2012/0254369 A1* | 10/2012 | Gillard | H04N 13/004 709/219 |
| 2012/0257005 A1* | 10/2012 | Browne | G02B 27/017 348/36 |
| 2013/0182066 A1* | 7/2013 | Ishimoto | H04N 7/181 348/38 |
| 2014/0037213 A1* | 2/2014 | Niederberger | G06T 11/00 382/195 |
| 2014/0049452 A1* | 2/2014 | Maltz | G06F 3/013 345/8 |
| 2016/0029883 A1* | 2/2016 | Cox | G06F 3/013 351/209 |
| 2016/0241892 A1* | 8/2016 | Cole | H04N 19/597 |
| 2016/0342205 A1* | 11/2016 | Shigeta | A61B 3/113 |

OTHER PUBLICATIONS

Cotting et al. Embedding Imperceptible Patterns into Projected Images for Simultaneous Acquisition and Display, Proceedings of the Third IEEE and ACM International Symposium on Mixed and Augmented Reality ISMAR 2004,.*

International Search Report and Written Opinion of the International Searching Authority for Int'l. Application No. PCT/EP2015/066665 dated Oct. 22, 2015, eleven (11) pages.

* cited by examiner

METHOD AND APPARATUS FOR DETECTING AND FOLLOWING AN EYE AND/OR THE GAZE DIRECTION THEREOF

CROSS REFERENCE TO RELATED APPLICATIONS

The present application claims the benefit of priority from British Patent application no 1412905.0 filed 21 Jul. 2014.

BACKGROUND

1. Field

The present invention relates to methods and apparatus for detecting an eye, e.g. a human eye, determining the direction of the gaze of the eye and/or following the location and gaze direction. In particular, the present invention relates to such methods and apparatus usable in vehicles.

2. Prior Art

It is known to detect an eye and its gaze direction by: illuminating a region in which the eye is sought with infrared radiation; capturing an infrared image of the region; and detecting bright spots in the image that derive from the pupil and cornea of the eye. This approach exploits the bright-eye or "red-eye" effect known to photographers whereby light enters the eye and is reflected or absorbed and re-emitted through the pupil, making the pupil appear brighter than the rest of the eye and the face. A separate, smaller bright spot (also referred to as a glint) is created by the cornea. The relative positions of the pupil and the corneal glint can be used to determine the direction of the gaze of the eye. More details are given in U.S. Pat. No. 6,152,563. The use of eye tracking in vehicles is disclosed in U.S. Pat. No. 8,314,707.

Information about the location of a person's eyes and the direction of their gaze can be used for a variety of purposes, for example behavioral research and control of computers and other electronic devices. In the eye-tracking system described in U.S. Pat. No. 6,152,563, an infrared illuminator and a camera are placed close to a computer display on which the user's gaze is to be tracked. Calibration of that system requires the user to fixate on a series of points on the computer display enabling a relationship between the position of the corneal glint relative to the pupil and the gaze point on the computer display to be calculated. This process is time consuming but does not depend on the relative positions of the computer display and camera as long as they are close and fixed. The location of the eye is not directly determined.

However, if the user's gaze is to be tracked over several areas, or areas that are not close to the camera, it is important to know accurately the orientation of the camera. Also, if the eye-tracking system is extended to include a plurality of illuminators and a plurality of cameras to improve accuracy, it becomes important to know the positions and orientations of all the cameras. Additional steps to calibrate the eye-tracking system are therefore required and the cameras must be rigidly fixed relative to each other to maintain the calibration. If the eye-tracking system is installed in a vehicle it will be subjected to vibrations and temperature variations which may disturb the positions and/or orientations of the cameras.

SUMMARY OF THE INVENTION

It is an aim of the present invention to provide an eye-tracking system that can maintain calibration even in a harsh environment.

According to the present invention, there is provided apparatus for detecting the position and/or gaze direction of an eye of a user in a vehicle, the apparatus comprising:

an illuminator arranged to direct infrared light towards a detection region;

a camera configured to generate an image of the detection region;

a controller configured to detect a calibration target in the image and to determine the position and/or orientation of the camera relative to the calibration target.

According to the present invention, there is provided a method for calibrating an apparatus for detecting the position and/or gaze direction of an eye of a user in a vehicle, the method comprising:

directing infrared light towards a detection region containing a calibration target;

generating an image of the detection region;

detecting the calibration target in the image; and determining the position and/or orientation of the camera relative to the calibration target.

BRIEF DESCRIPTION OF THE DRAWINGS

The invention is described below with reference to exemplary embodiments and the accompanying drawings, in which.

In the drawings, like parts are indicated by like references.

DETAILED DESCRIPTION

An embodiment of the invention aims to provide a method and apparatus for detecting an eye, e.g. a human eye, determining the direction of the gaze of the eye and/or following the location and gaze direction, in which the position and/or orientation of a camera can be quickly and automatically determined for calibration purposes. The term eye-tracking system is used herein to refer to any system that detects and/or monitors the location of an eye and/or the direction of the gaze of an eye.

A calibration target is provided at a known location within the field of view of the camera and is identified in the image taken by the camera by a controller. From the position of the calibration target in the image, it is therefore possible to calculate the position of the camera relative to the interior of a vehicle in which it is installed. Calibration by this approach can be carried out very quickly, allowing it to be repeated whenever necessary. It is possible to perform eye-tracking reliably in a vehicle having a harsh environment that subjects a camera to disturbances, such as vibrations and temperature changes, which might disturb the position and/or orientation of the camera.

With accurate calibration of the position of a camera in an eye-tracking system, it is possible to track the gaze of a user accurately even when the user's gaze is directed away from the camera. Additional applications of eye-tracking are made possible, for example control of head-up displays or augmented reality displays using a vehicle windscreen.

The calibration target may be a dedicated target provided for the purposes of the calibration. A dedicated target can be made of a retro-reflective material so that it appears bright in the camera image if the illumination source is close to the camera. A dedicated target can be a predetermined shape and/or size so that its shape and/or size in the camera image, as well as its position, can be used to derive information as to the position and/or orientation of the camera.

The calibration target can be a fixed component of the vehicle that is provided for another purpose. In a car, an interior light, a seat headrest or a grab handle above the driver or passenger's door can serve as a calibration target. Use of a fixed component avoids the cost of providing a dedicated target and avoids any detrimental effect on the appearance of the vehicle interior.

The calibration target can be passive, i.e. it merely reflects or scatters the light with which it is illuminated. The calibration target may be fluorescent, i.e. it absorbs light and re-emits light at a different wavelength. The calibration target can be arranged to be more visible or more distinctive in a wavelength range outside the visible band, e.g. in infrared or ultraviolet, and less visible or less distinctive in the visible band.

The calibration target can be active, i.e. generating and emitting light. An active calibration target, e.g. an LED, can be controlled so that it selectively emits light during the calibration process.

The eye-tracking system can have a plurality of cameras, e.g. to improve accuracy, to allow tracking of multiple users or to extend the range of the eye-tracking system. The plurality of cameras can have at least partially overlapping fields of view and a calibration target can be located within the overlap between the fields of view of at least two cameras to enable the relative positions of the two cameras to be determined without needing to know the relative positions of two or more calibration targets.

There can be a plurality of calibration targets. The number of calibration targets provided may depend on the number of cameras and their fields of view, as well as the number of degrees of freedom in which the camera(s) is to be located. The six degrees of freedom in which a rigid body can be positioned may be denoted in a Cartesian reference system X, Y, Z, Rx, Ry, Rz, with Rn denoting rotation about an axis parallel to Cartesian axis N. A polar reference system can also be used. A non-linear reference system may be used, especially where the camera optics are non-linear. Alternatively or in addition, a transformation may be applied to convert non-linear coordinates related to position in the field of view of the camera to a linear coordinate system. In a vehicle, the reference system can be fixed relative to the vehicle. The orientation can be described in terms of pitch, roll and yaw.

The number of calibration targets can be greater than the minimum number necessary for location of the cameras in the system in a desired number of degrees of freedom. Extra calibration targets can be used to improve accuracy and/or to allow the eye-tracking system to perform calibration even if one or more calibration targets is damaged or obscured, e.g. by the user.

Calibration can be performed on installation of the device, at predetermined intervals, and/or in response to specific events. A motion detector may be provided with the camera to indicate if a shock has occurred that is likely to make recalibration necessary. A manual trigger for recalibration can be provided. Calibration can be performed each time the system is activated. If the camera is positioned on a movable component of a vehicle, e.g. the steering column of a car, the eye-tracking system can be recalibrated each time the movable component is moved.

A vehicle may have a profile storage device which stores one or more user profiles, including parameters such as the user's preferred seat position and preferred steering column position, and a system to automatically adjust relevant components of the vehicle when a user profile is selected. The eye-tracking system can interact with the user profiles in various ways. Calibration can be automatically performed when a user profile is selected. Calibration parameters can be stored in the user profiles. Other parameters in a user profile can be used in the calibration process.

A specific embodiment of the invention will now be described with reference to the Figures.

Figure 1:
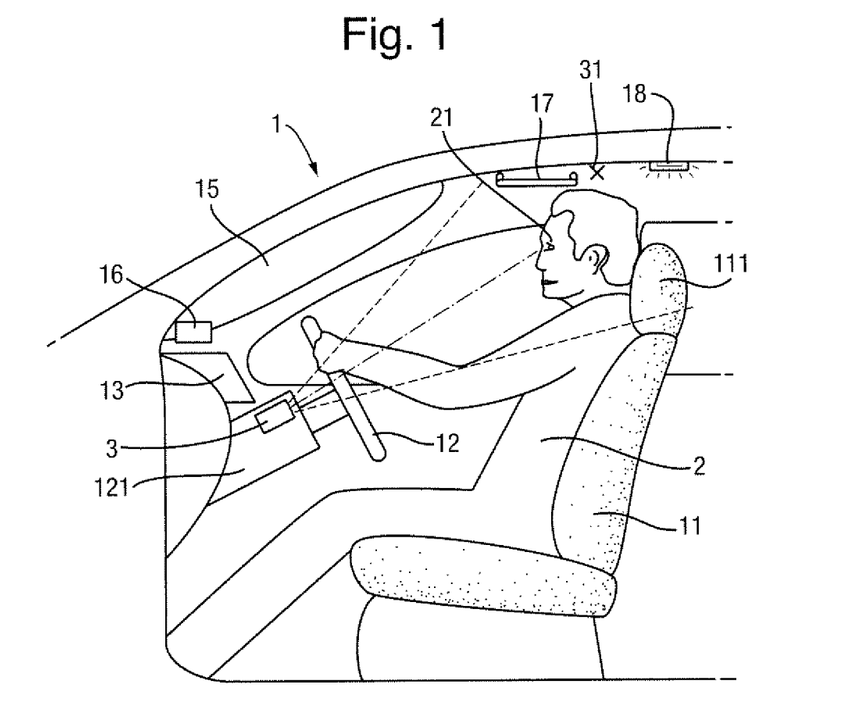
FIG. 1 depicts an eye-tracking system according to an embodiment installed in a car.

FIG. 1 depicts a car 1 in which an eye-tracking system 3 is installed to detect and monitor the location of at least one eye 21 of the driver 2 and the direction of his/her gaze.

Figure 2:
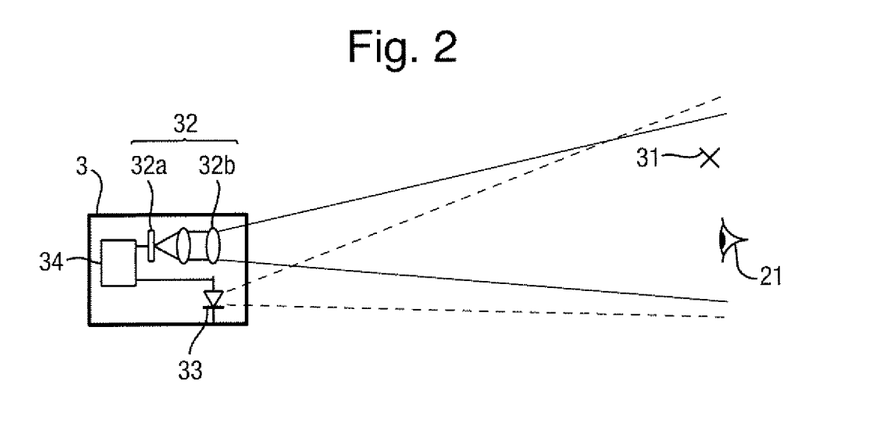
FIG. 2 depicts the eye-tracking system and a calibration target.

The eye-tracking system is mounted on the steering column 121 which supports steering wheel 12. As shown in FIG. 2, the eye-tracking system 3 comprises: a camera 32 comprising image sensor 32a and imaging lens 32b; an infrared light source 33; and controller 34. The image sensor 32a is sensitive to at least some of the infrared radiation emitted by the infrared light source 33. Widely available CCD sensors or CMOS sensors can be used as the image sensor 32a. The infrared light source illuminates the upper part of the cabin in infrared light so that the driver's face is illuminated and can be imaged by the camera 32. Controller 34 can comprise a suitably programmed general purpose computer, having a processor and memory, or a single purpose device such as an ASIC.

As is known, the driver's eyes will be easily detectable, due to the bright-eye effect, in the image captured by the camera 32 and the position of a corneal glint relative to the pupil image indicates the direction of the driver's gaze. An efficient system for detecting the eye position and gaze direction is disclosed in US 2006/0238707. The present invention can also be applied to an eye tracker using dark pupil eye tracking where an illuminator is placed off-axis to make the pupil of the eye appear as a dark disk.

The region that is illuminated by infrared light source 33 and imaged by camera 32 is referred to as the detection region and includes at least one calibration target 31. In an embodiment, calibration target 31 is a retroreflective sticker of predetermined size and predetermined position within the cabin of the car, e.g. on the ceiling thereof above the driver's head. Calibration target 31 can have any shape that allows it to be identified in the camera image, for example, a circle, a square, a star, a cross, a line.

Alternatively, or in addition, an existing component of the car that has a fixed position, such as a grab handle 17 or interior light 18, can be employed as a calibration target. A component of the car that is movable, such as a seat 11 or headrest 111 is less suitable. If an existing component is used as a calibration target, its shape and/or coloration can be modified to improve detectability whilst it retains its original function.

Controller 34 can comprise a pattern recognition module configured to recognize the calibration target. In an embodiment, the illumination provided by infrared light source 33 is modulated, e.g. by turning it on and off at a predetermined frequency. An image taken with the infrared light source 33 off is subtracted from one taken with the infrared light source 33 on to generate a difference image. Retro-reflective and infra-red reflective parts of the image will be highlighted in the difference image.

Given sufficiently accurate calibration of the position of eye-tracking system 3 it can be used for a variety of purposes. For example, it can be used to determine whether the driver is looking out of the windscreen 15 or at the instrument console 13. When the driver is looking at the instrument console 13, the exact location of the driver's gaze may control what is displayed on the instrument console 13. For example, when the driver looks at a message section of the instrument console, a scrolling message may be displayed. By ceasing scrolling of the message when the driver looks away a potential distraction is avoided.

The car 1 may include an information/entertainment system (not shown) providing functions such as navigation, climate control, a radio, a CD player or a digital audio player. The information/entertainment system may be located in the center console of the vehicle. The information/entertainment system can be controlled so that its display awakes only when it is looked at. A pointer on a display of the information/entertainment system can be controlled by the driver's gaze. The eye-tracking system, or at least a sensor module thereof, can be integrated into the instrument console 13 and/or the information/entertainment system.

The car may be provided with a projector 16 for projecting images onto the inside of the windscreen 15. The projector 16 can be used to project a so-called head-up display presenting information such as the car's speed and/or navigation instructions. With accurate knowledge of the position of the driver's eyes and the direction of his or her gaze provided by eye-tracking system 3, the projector 16 can be extended in functionality to provide augmented reality functions. For example, the car may be provided with a forward-facing infrared camera which is able to detect potential hazards such as animals or people even in conditions of darkness or limited visibility. An image of a detected hazard can be projected onto the windscreen 15 as an augmentation image so that the hazard is emphasized. Such a function however requires the position of the driver's eyes to be known with sufficient accuracy so that the augmentation image and real exterior line up correctly.

The output of eye-tracking system 3 can be used to control safety systems in the car. For example, the detected position of the driver's eyes can be used to control the inflation of an airbag provided in the steering wheel 12 in the event of an accident. If the driver's head is too close to the steering wheel 12 it is possible to inhibit or control inflation of the airbag. The eye-tracking system can also detect if the driver is not looking forward or the driver's eyes are closed for an extended period of time and this may be used to trigger an attention alarm.

Eye-tracking system 3 in this embodiment is mounted on the steering column 121. This is a convenient location to allow the camera 32 to image the driver's eyes. However, the steering column 121 may be adjustable to suit the driver. When the position of the steering column is adjusted, the position of eye-tracking system 3 changes and re-calibration is required. Eye-tracking system 3 can be provided with a switch connected to the mechanism for adjusting the position of the steering column to trigger re-calibration when the steering column is moved. Eye-tracking system 3 can be provided with a motion sensor in the event that movement of the eye-tracking system is detected, whether or not caused by movement of the steering column 121. If the car has a system for automatic adjustment of the position of the steering column 121, e.g. by reference to a driver profile which may control other parameters such as the position of seat 11, the eye-tracking system may be connected to that control system to trigger re-calibration. Alternatively or in addition, when a given profile is selected, calibration parameters obtained when the profile was established can be loaded into the eye-tracking system 3.

Figure 3:
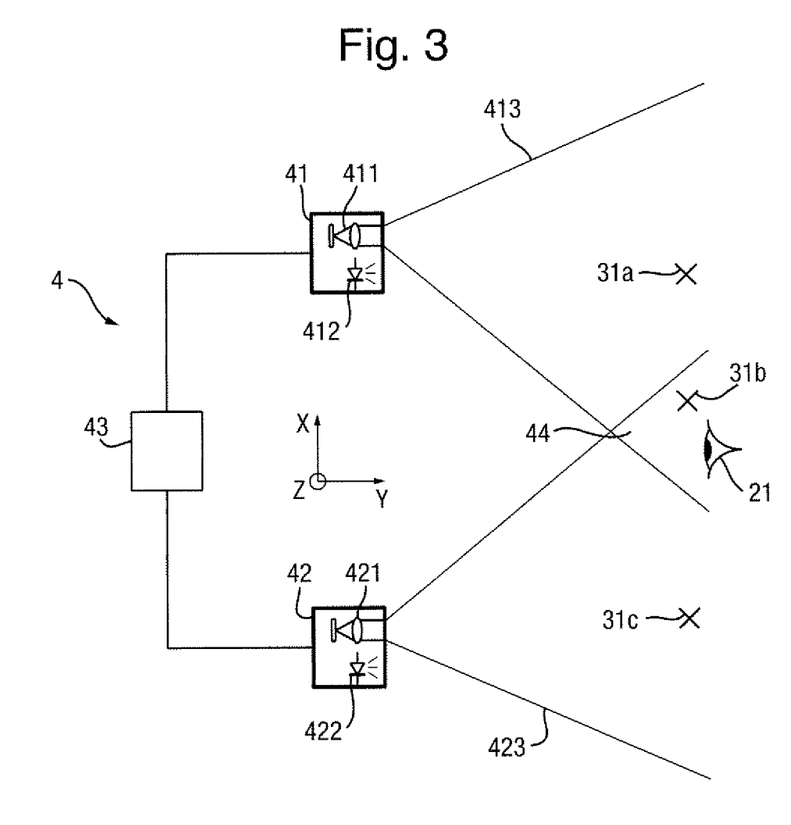
FIG. 3 depicts an eye-tracking system having a plurality of cameras.

FIG. 3 shows an alternative eye-tracking system 4 which has two sensor modules 41, 42. Additional sensor modules can be provided if desired. Sensor module 41 includes a camera 411 and infrared light source 412. Likewise sensor module 42 comprises a camera module 421 and infrared light source 422. Both sensor modules 41, 42 are connected to a control system 43. Alternatively or in addition, separate controllers can be provided in each sensor module. Sensor modules 41, 42 are positioned at spaced apart locations within the vehicle and have respective fields of view 413, 423. The fields of view 413, 423 overlap in an overlap region 44.

The calibration process for a plurality of sensors can be performed sequentially or in parallel. Sequential calibration minimizes the chance of crosstalk between the calibration processes. Parallel calibration can be faster. If parallel calibration is performed, each sensor module can use a different frequency of modulation of the illumination to reduce crosstalk. A plurality of calibration markers 31a, 31b, 31c are provided. At least one of the calibration markers 31b is within the overlap region 44.

The use of a plurality of sensor modules 41, 42 can provide various advantages. A plurality of sensor modules can provide redundancy, e.g. to allow the driver's eyes to be tracked even when an obstruction is between one of the camera modules 411, 421 and the driver's head. A plurality of sensor modules 41, 42 can also improve accuracy of detection of the driver's gaze and increase the gaze target area, that is the range of directions into which the user may look and still have his/her gaze direction accurately determined. A plurality of sensor modules 41, 42 can be arranged to provide a wider field of view in which the driver's eyes can be tracked. A plurality of sensor modules 41, 42 can be used to enable tracking of the eyes of a plurality of people, e.g. passengers in the vehicle as well as the driver. In an eye-tracking system with a plurality of cameras, the detection region can be the union of the respective fields of view of the cameras or the overlap of the respective fields of view.

Figure 4:
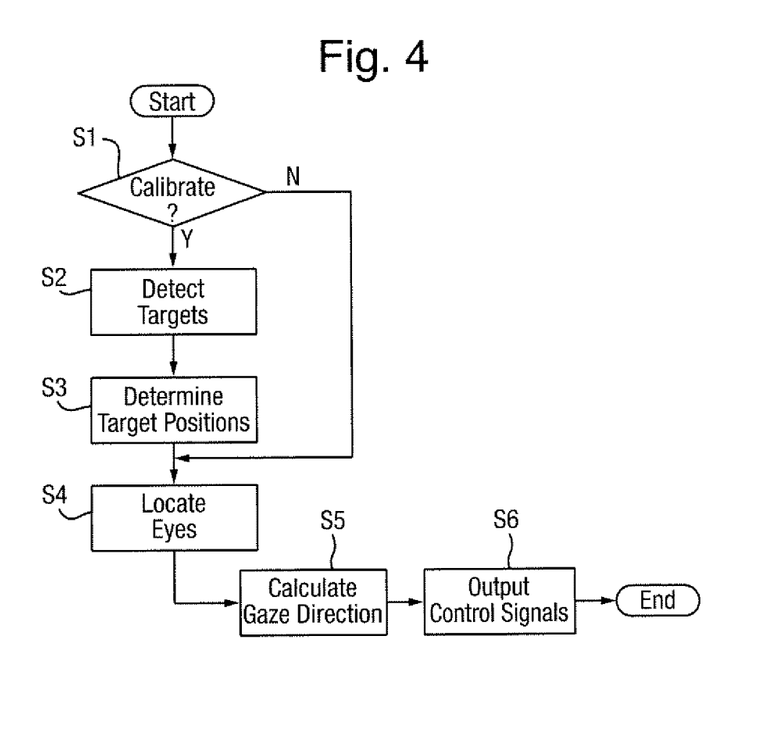
FIG. 4 depicts a method of gaze detection including calibration steps.

A method of eye-tracking according to an embodiment of the invention is illustrated schematically in FIG. 4. The method comprises:

Deciding S1 whether or not calibration is necessary. If not, the method skips to S4, otherwise the method progresses to step S2.

Detecting S2 the calibration targets 31 in an image taken by the camera or cameras.

Determining S3 the positions of the targets in the camera image and calculating necessary calibration parameters.

Locating S4 the driver's eyes in an image taken by the camera or cameras.

Calculating S5 the gaze direction of the driver.

Outputting S6 relevant control signals.

Figure 5:
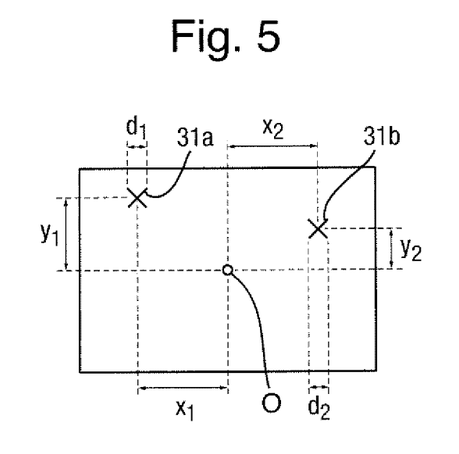
FIG. 5 depicts an image used in a calibration method.

FIG. 5 depicts an example of an image used in calibration. In the image, calibration targets 31a, 31b are detected. The pixel coordinates $x_1$, $y_1$ of the center of the image of a first calibration target 31a relative to an origin O are determined in two orthogonal directions. Similarly, the position of the center of the image of second calibration target 31b is determined as $x_2$, $y_2$. The values $x_1$, $y_1$, $x_2$, $y_2$ can be used to determine the position and/or orientation of the camera which has taken the calibration image in up to 4 degrees of freedom.

In an embodiment, a sensor module is mounted such that its position in space (e.g. denoted by Cartesian co-ordinates X, Y, Z) is fixed but its orientation (e.g. denoted by angles $R_x$, $R_y$, $R_z$) is subject to change. e.g. due to vibration. Suppose that the nominal position of the sensor module the center of the first calibration target 31$a$ in the camera image would be at pixel coordinates $x_0$ $y_0$. To determine the approximate rotation $\delta R y$ of the sensor module about an axis parallel to the Y direction, we can consider the change $\delta x$ in x coordinate of the center of the image of the first calibration target 31$a$, given by $$\delta X = X_0 - X_1, \quad (1)$$

the rotation is then given by $$\delta Ry = \frac{\delta x \cdot F_x}{W_x} \quad (2)$$

where $F_x$ is the width of the field of view of the camera in the x direction and $W_x$ is the width of the camera image in pixels.

The above calculation assumes no rotation of the camera about its optical axis. If such a rotation is likely this can be determined by comparing the shift in position of the centers of the images of first and second calibration targets 31$a$, 32$a$. Then an appropriate correction can be applied to $\delta x$.

The position in additional degrees of freedom can be found by using additional targets. Alternatively, additional information can be derived from the sizes $d_1$, $d_2$ of calibration targets 31$a$, 31$b$ in the image. However, if the camera of the eye-tracking system has a fixed or short depth of field, calibration targets 31$a$, 31$b$ may not be well focused in the image. A calibration target being out of focus may not prevent it being used for calibration purposes if the position of its center can still be determined with sufficient reliability.

Although the invention has been described above with reference to exemplary embodiments, it will be appreciated that the invention may be practiced otherwise than as described. For example, rather than providing parameters to correct a determination of eye position or gaze direction, the calibration process can be used simply to determine whether a camera has shifted from its intended position so that manual or automatic adjustment of the camera position needs to be performed. Also, the eye-tracking system can be used in other types of vehicles, including: trucks, vans, lorries, trains, planes, boats, ships, mining vehicles, construction vehicles and self-driving (autonomous) vehicles. The scope of the invention is to be limited only by the spirit and scope of the appended claims.

The invention claimed is:

1. Apparatus for detecting the gaze direction of an eye of a user in a vehicle, the apparatus comprising:
   an illuminator arranged to direct infrared light towards a detection region, the detection region including the eye of the user and a calibration target at a known location in the vehicle;
   a plurality of cameras having at least partially overlapping fields of view in the detection region and configured to generate an image of the detection region which includes the calibration target and the eye of the user;
   a controller configured to detect from the image the calibration target in an overlap region of the image corresponding to the at least partially overlapping fields of view of at least two of the plurality of cameras, and to determine the position and/or orientation of the at least two cameras relative to the calibration target, wherein the controller detects the calibration target from at least two of the plurality of cameras simultaneously;
   a sensor configured to detect a change in the position and/or orientation of at least one of the plurality of cameras with respect to the calibration target, and upon detection of a change in the position and/or orientation, the controller configured to detect again the calibration target at the known location in an overlap region of an image of the detection region and to determine again the position and/or orientation of the at least one of the plurality of cameras relative to the calibration target, wherein the controller detects again the calibration target from at least two of the plurality of cameras simultaneously;
   the controller further configured to detect, based on an image from at least one of the plurality of cameras, a gaze direction of an eye of the user of the vehicle.

2. Apparatus according to claim 1, wherein the controller is configured to detect a plurality of calibration targets in one image.

3. Apparatus according to claim 1, wherein the controller comprises a pattern recognizer for recognizing a component of a vehicle as the calibration target.

4. Apparatus according to claim 1, further comprising a calibration target, the calibration target comprising a retro-reflector.

5. A vehicle having installed therein apparatus according to claim 1.

6. A method for calibrating and using an apparatus for detecting the gaze direction of an eye of a user in a vehicle, the method comprising:
   directing infrared light towards a detection region which includes the eye of the user and a calibration target at a known location in the vehicle;
   generating an image of the detection region using a plurality of cameras, the plurality of cameras having at least partially overlapping fields of view in the detection region;
   detecting from the image the calibration target in an overlap region corresponding to the at least partially overlapping fields of view of at least two of the plurality of cameras simultaneously;
   determining the position and/or orientation of the at least two cameras relative to the calibration target;
   sensing a change in the position and/or orientation of at least one of the plurality of cameras with respect to the calibration target, and upon sensing of a change in the position and/or orientation, detecting again the calibration target simultaneously at the known location in an overlap region of an image of the detection region and determining again the position and/or orientation of the at least one of the plurality of cameras relative to the calibration target; and
   detecting, based on an image from at least one of the plurality of cameras, a gaze direction of the user of the vehicle.

7. Apparatus according to claim 1, wherein each of the plurality of cameras are provided in a respective sensor module, each respective sensor module including an image sensor and an infrared light source.

8. Apparatus according to claim 1, wherein the controller is configured to detect two calibration targets in one image, the two calibration targets being in two orthogonal directions with respect to a predetermined position in the image.

9. Apparatus according to claim 2, wherein the controller is configured to determine the position and/or orientation of the at least two cameras based on detected positions of the plurality of calibration targets.

10. A method according to claim 6, further comprising detecting a plurality of calibration targets in one image.

11. A method to claim 10, further comprising determining the position and/or orientation of the at least two cameras based on detected positions of the plurality of calibration targets.

12. A method according to claim 10, further comprising detecting tow calibration targets in one image, the two calibration targets being in two orthogonal directions with respect to a predetermined position in the image.

13. A method according to claim 6, further comprising recognizing a component of a vehicle as the calibration target.

14. A method according to claim 6, wherein the calibration target comprises a retro-reflector.

15. A method according to claim 6, wherein each of the plurality of the plurality of cameras are provided in a respective sensor module, each respective sensor module including an image sensor and an infrared light source.

16. Apparatus for detecting the gaze direction of an eye of a user in a vehicle, the apparatus comprising:
    an illuminator arranged to direct infrared light towards a detection region, the detection region including the eye of the user and calibration targets at known locations in the vehicle;
    a plurality of cameras responsive to the light in the detection region and configured to generate an image of the detection region, said detection region image including images of calibration targets at the known locations, the plurality of cameras having at least partially overlapping fields of view in an overlap region of the detection region;
    a pattern recognition module to recognize the calibration targets;
    a sensor configured to detect a change in the position and/or orientation of at least one of the plurality of cameras; and
    a control system responsive to the pattern recognition module, to the sensor and to the cameras and operating suitable programs to:
        (i) determine simultaneously, for each camera, in two orthogonal directions, pixel coordinates of a center of an image of a first calibration target relative to an origin,
        (ii) determine simultaneously, for each camera, in two orthogonal directions, pixel coordinates of a center of an image of a second calibration target relative to the origin, and
        (iii) utilize, for each camera, the pixel coordinates of the first calibration target and of the second calibration target to determine the position and/or orientation of the at least one of the plurality of cameras relative to the calibration targets,
        (iv) upon the sensor detecting a change in the position and/or orientation of the at least one of the plurality of cameras, with respect to the calibration target repeat steps (i) to (iii), and detecting again the calibration target at the known location in a region of an image of the detection region, and
        (v) detect, based on an image from at least one of the plurality of cameras, a gaze direction of an eye of the user of the vehicle.

17. Apparatus for detecting the gaze direction of an eye of a user in a vehicle, the apparatus comprising:
    an illuminator arranged to direct infrared light towards a detection region, the detection region including the eye of the user and a calibration target at a known location in the vehicle;
    a plurality of cameras responsive to the light in the detection region and configured to generate an image of the detection region, the plurality of cameras having at least partially overlapping fields of view in an overlap region of the detection region;
    a controller responsive to the cameras and configured to detect a calibration target at the known location in the overlap region of the image and to determine the position and/or orientation of the at least two cameras relative to the calibration target, wherein the controller detects the calibration target from at least two of the plurality of cameras simultaneously;
    a sensor configured to detect a change in the position and/or orientation of at least one of the plurality of cameras with respect to the calibration target, and upon a change the controller configured to detect again the calibration target at the known location in a region of an image of the detection region corresponding to an overlapping detection region of at least two of the plurality of cameras, and to determine the position and/or orientation of the at least two cameras relative to the calibration target, wherein the controller detects again the calibration target from at least two of the plurality of cameras simultaneously;
    the controller further configured to detect, based on an image from at least one of the plurality of cameras, a gaze direction of an eye of the user of the vehicle.

18. Apparatus according to claim 1, wherein the plurality of cameras each use a different frequency of modulation.

19. Apparatus according to claim 6, wherein the plurality of cameras each use a different frequency of modulation.

20. Apparatus according to claim 16, wherein the plurality of cameras each use a different frequency of modulation.

* * * * *

UNITED STATES PATENT AND TRADEMARK OFFICE
CERTIFICATE OF CORRECTION

PATENT NO. : 10,705,600 B2
APPLICATION NO. : 14/804524
DATED : July 7, 2020
INVENTOR(S) : Skogö

Page 1 of 1

It is certified that error appears in the above-identified patent and that said Letters Patent is hereby corrected as shown below:

On the Title Page

Item (12) "Skogo" should be changed to --Skogö--.

Item (72) "Marten Skogo" should be changed to --Mårten Skogö--.

Signed and Sealed this
Twelfth Day of August, 2025

Coke Morgan Stewart
*Acting Director of the United States Patent and Trademark Office*